J. O. WILSON & R. BOLINGER.
Fly-Screen.
No. 223,205.      Patented Dec. 30, 1879.
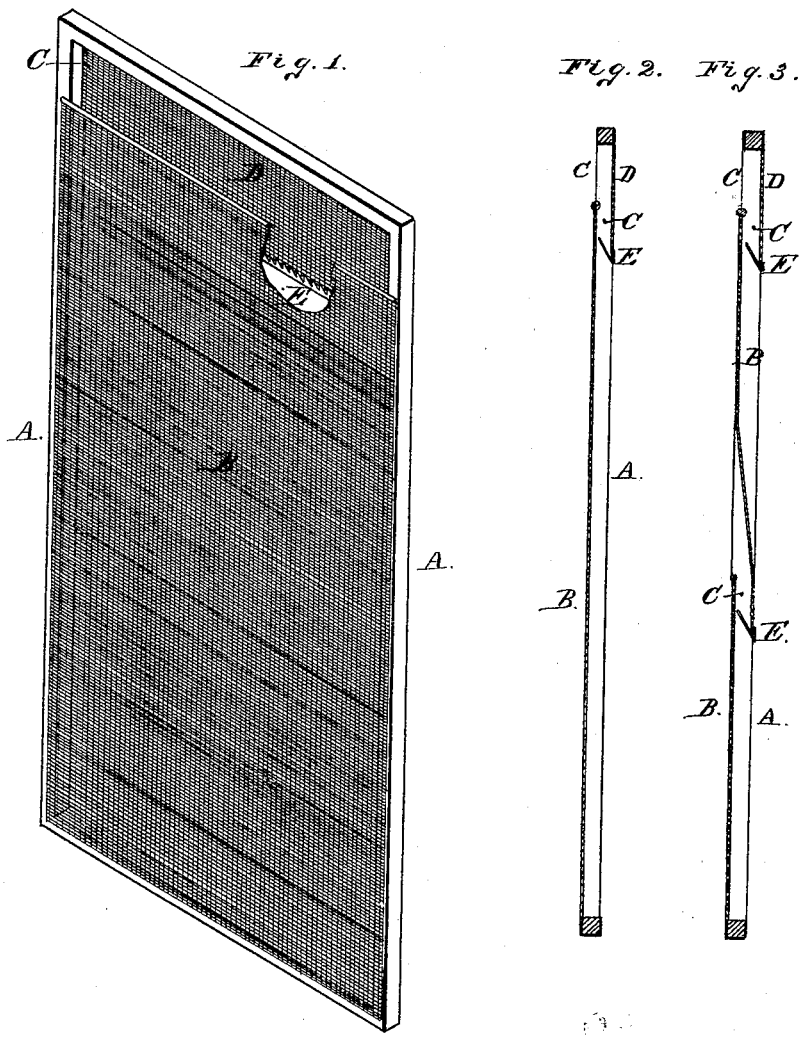

UNITED STATES PATENT OFFICE.

JAMES O. WILSON, OF ST. LOUIS, MISSOURI, AND REUBEN BOLINGER, OF JACKSONVILLE, ILLINOIS; SAID BOLINGER ASSIGNOR TO SAID WILSON.

IMPROVEMENT IN FLY-SCREENS.

Specification forming part of Letters Patent No. 223,205, dated December 30, 1879; application filed April 2, 1879.

*To all whom it may concern:*

Be it known that we, JAMES OLIVER WILSON, of the city of St. Louis, in the State of Missouri, and RUEBEN BOLINGER, of Jacksonville, in the county of Morgan and State of Illinois, have invented a certain new and useful Improvement in Fly-Escapes, of which the following is a full, clear, and exact description, reference being had to the accompanying drawings, forming part of this specification.

Our invention relates to an improvement on the screens composed of wire gauze or netting stretched upon a frame, and arranged to fit in window or door frames to prevent the entrance of flies and other insects.

Our improvement consists in forming in the netting part of the screen a device to allow the easy exit from the room of any insect walking up the screen. This device is formed by attaching to the outer face of the frame a piece of gauze or netting, which extends upward from the bottom to near the top, where an aperture is left to allow the escape of the insects. Another piece of the material is fastened to the inner face of the frame, extending from the top downward to a point somewhat below the top of the other piece. Thus between the two pieces of gauze is a space the width of the thickness of the frame. In this space are a number of inclined teeth extending upwardly from the bottom of the upper piece to nearly the inner surface of the lower and outer piece. These teeth do not materially interfere with the exit of insects, which may walk up and between the teeth; but the teeth render it difficult for insects to return or enter downward through the escape-opening.

The device for escape of insects may be at any elevation in the screen, or there may be two or more of such devices.

In the drawings, Figure 1 is a perspective view of the invention, with part of the outer sheet of gauze broken out to show the inclined teeth within the aperture for the escape of the insects. Fig. 2 is a vertical section through the middle of the screen. Fig. 3 is a vertical section, showing the device for the escape of insects, with openings at different elevations.

A is a frame made to fit within a door or window frame in the usual manner of fly-screens.

B is a sheet of wire-gauze or some other open-work fabric that will allow the passage of air and will prevent the passage of flies. The sheet B is of less length than the frame A, and may extend continuously from one end of the frame to near the other end, leaving a space, C, thereat, as shown in Fig. 2; or it may be secured to said frame in two or more separate pieces, so that two or more openings may be formed in the screen, as shown in Fig. 3, a space, C, being left at the top of each sheet B. The sheet B is attached to the outer face of the frame A, as shown.

D is a sheet, which may be of similar material to that of B, and which is attached to the inner face of the frame A, and extends from the top of the frame downward somewhat below the top of the sheet B.

At the lower edge of sheet D is a plate or angle-strip, E, having a row of upturned teeth extending almost to the sheet B. Between the teeth are spaces, through which flies can pass as they walk upward. They will not be likely to pass downward between the teeth, because their habit is to walk upward and to fly downward, and in flying downward they would not pass through the spaces between the teeth, as said spaces would be too small to allow easy passage with the wings spread.

This screen may be used as a partition across a room or passage, to prevent the passage of insects in one direction and allow it in the other direction.

Having fully described our improvement, what we claim as new and of our invention is—

1. In combination with the sheets B and D, the toothed plate E, arranged substantially as set forth.

2. The frame having gauze sheets B and D, with one or more apertures, and a toothed plate, E, as and for the purpose described.

JAMES OLIVER WILSON.
REUBEN BOLINGER.

Witnesses as to Wilson's signature:
SAML. KNIGHT,
GEO. H. KNIGHT.

Witnesses as to Bolinger's signature:
THOS. P. STACY,
W. H. McCULLOUGH.